United States Patent [19]
Ulve

[11] 3,898,752
[45] Aug. 12, 1975

[54] TREE STUMP PULLING MACHINE

[75] Inventor: Gene A. Ulve, Lake Mills, Iowa

[73] Assignee: Tree-Mate Corporation, Lake Mills, Iowa

[22] Filed: May 1, 1973

[21] Appl. No.: 356,100

[52] U.S. Cl. ................................ 37/2 R; 171/58
[51] Int. Cl. ........................................... A01g 23/06
[58] Field of Search ............... 37/2 R, 2 P; 171/58; 172/555, 570, 574, 575, 538, 604, 589

[56] References Cited
UNITED STATES PATENTS
3,815,266   6/1974   Schmitz et al. ...................... 37/2 R

*Primary Examiner*—Edgar S. Burr
*Assistant Examiner*—R. E. Suter
*Attorney, Agent, or Firm*—Morton S. Adler

[57] ABSTRACT

This is a trailer mounted machine which includes an especially designed elongated frame or chassis having wheels intermediate its length appropriate for road travel and relatively large and sturdy opposed digging wheels of a novel design at the rear for embraceably engaging and rolling a stump out of the ground as the trailer is pulled by a prime mover. The axles of the digging wheels are angled so that the opposed edges of such wheels define a V-shape with the converging edges oriented toward the ground. The road wheels include a linkage assembly which is associated with a power operated lifting harness designed to elevate the digging wheels when the road wheels are lowered for road travel and to lower the digging wheels when the road wheels are elevated for stump removal operations. The digging wheels are laterally movable towards and away from each other within prescribed limits and power means are provided to hold them at or move them to selected positions of lateral spacing relative to the diameter of the stump encountered.

14 Claims, 11 Drawing Figures

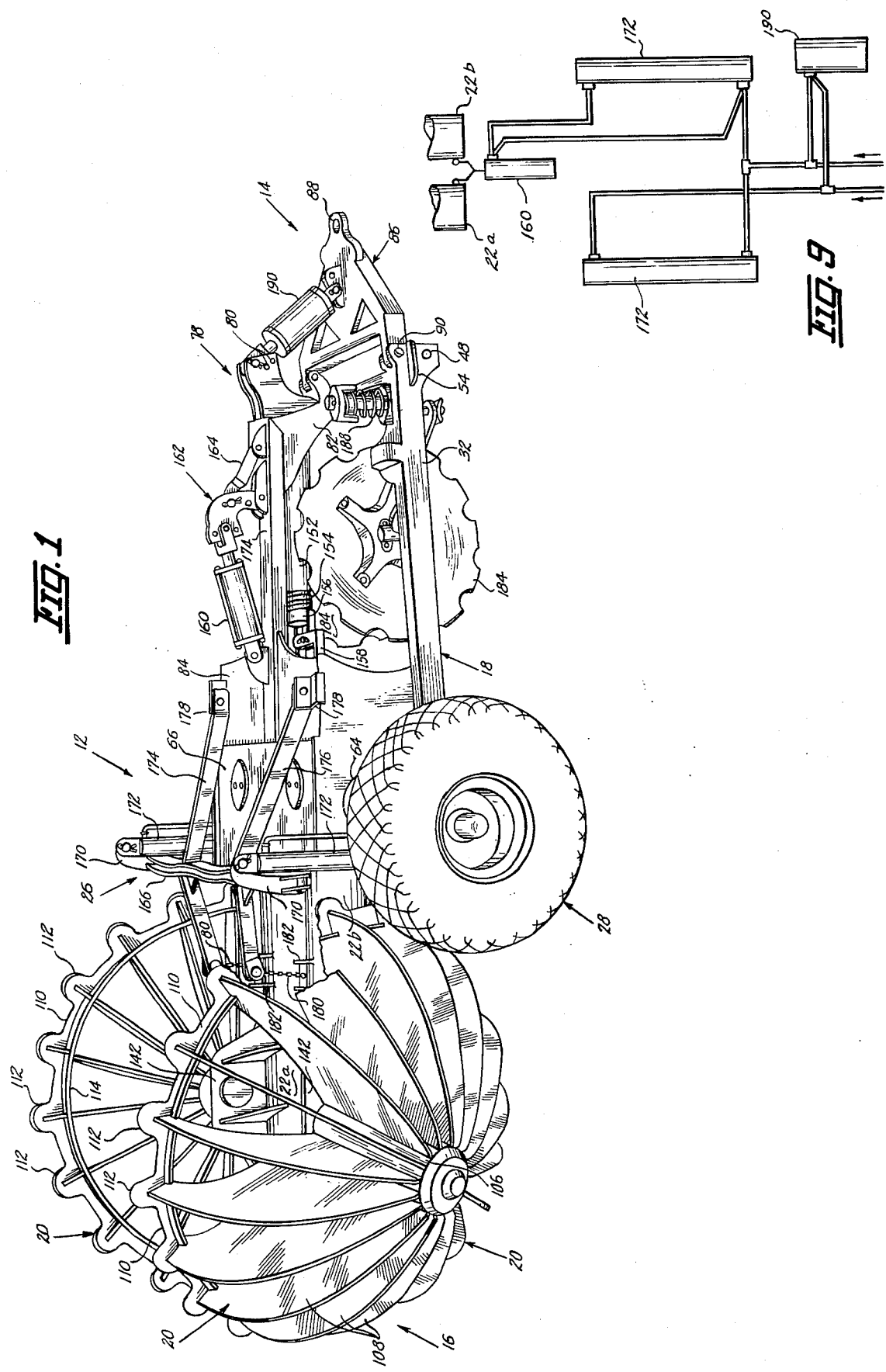

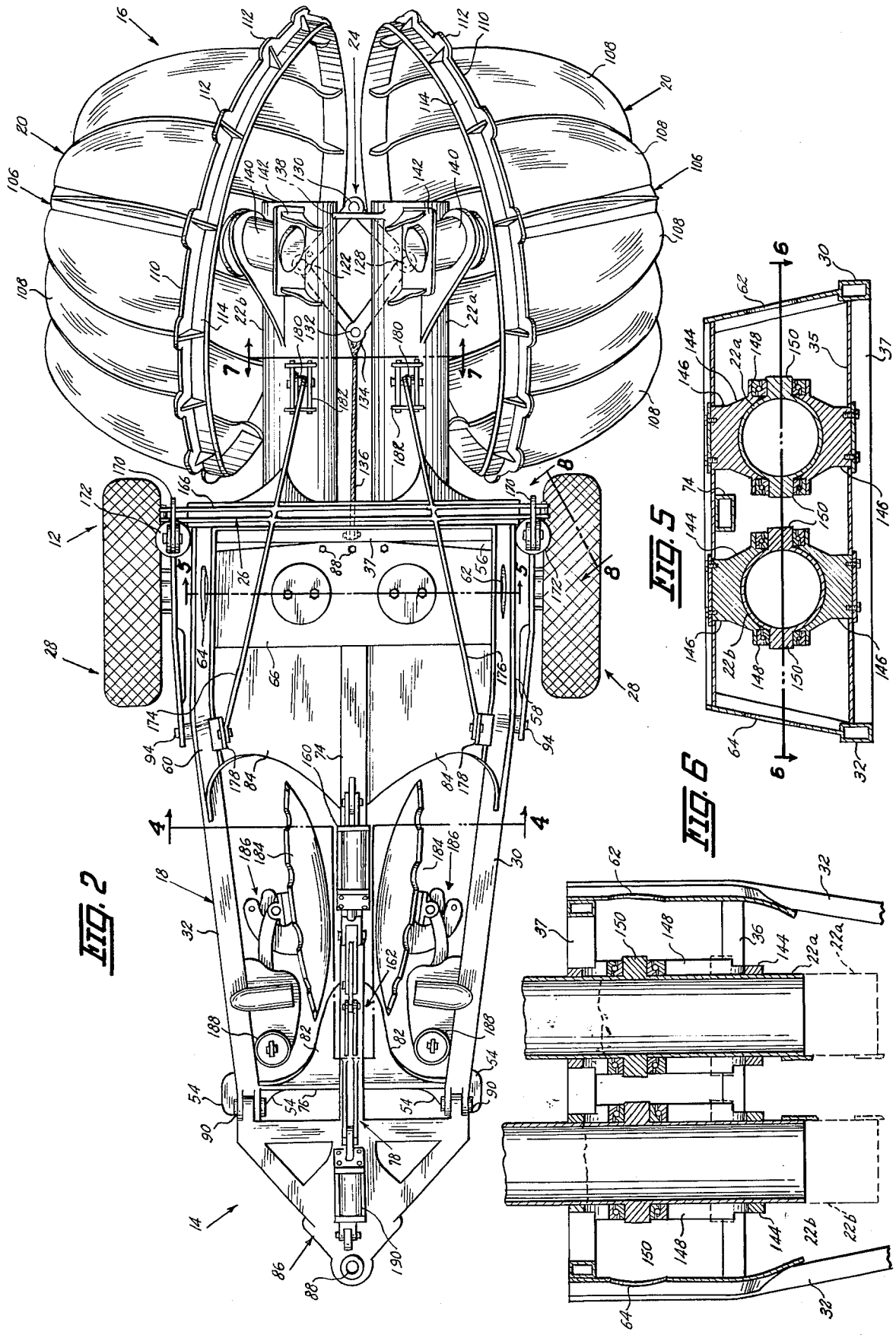

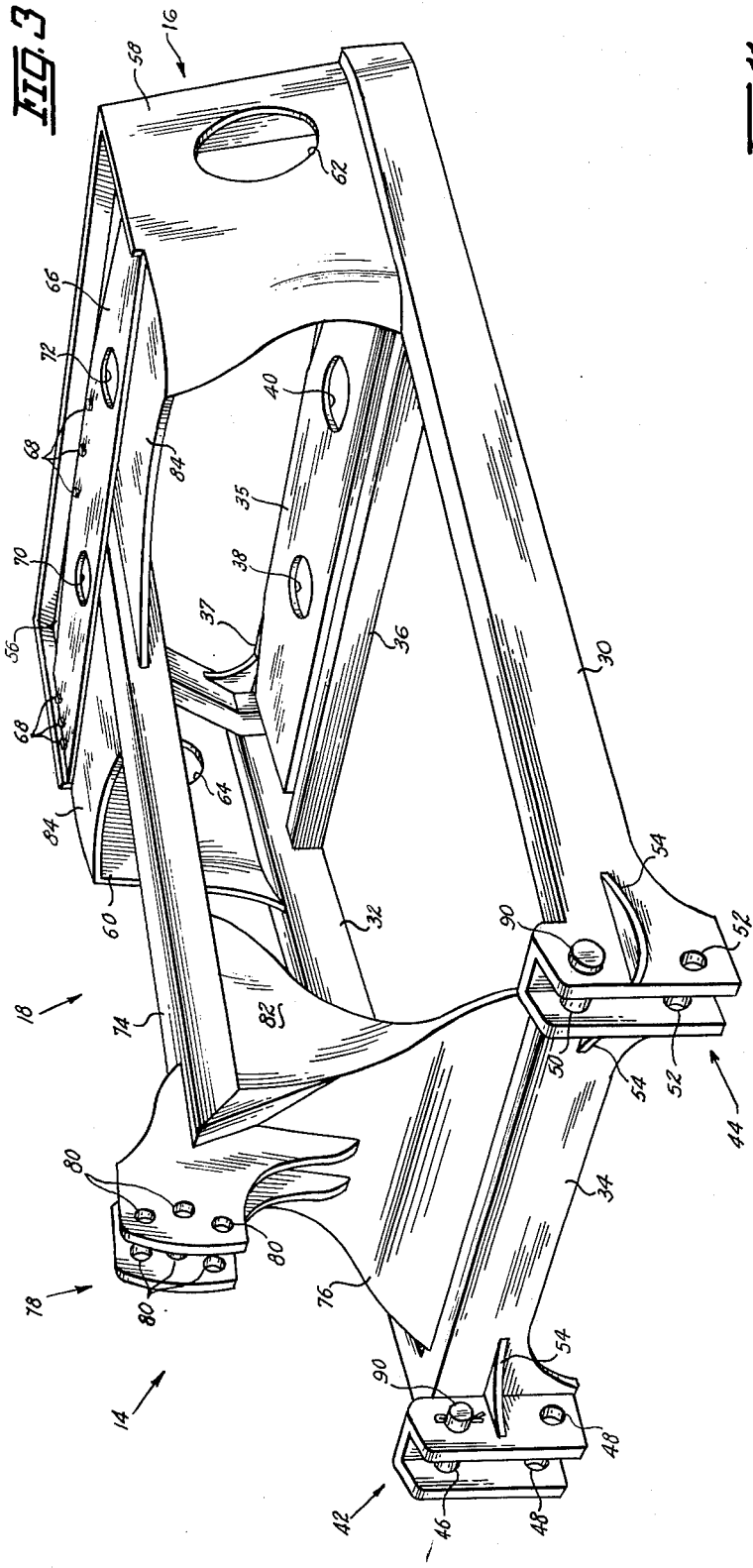

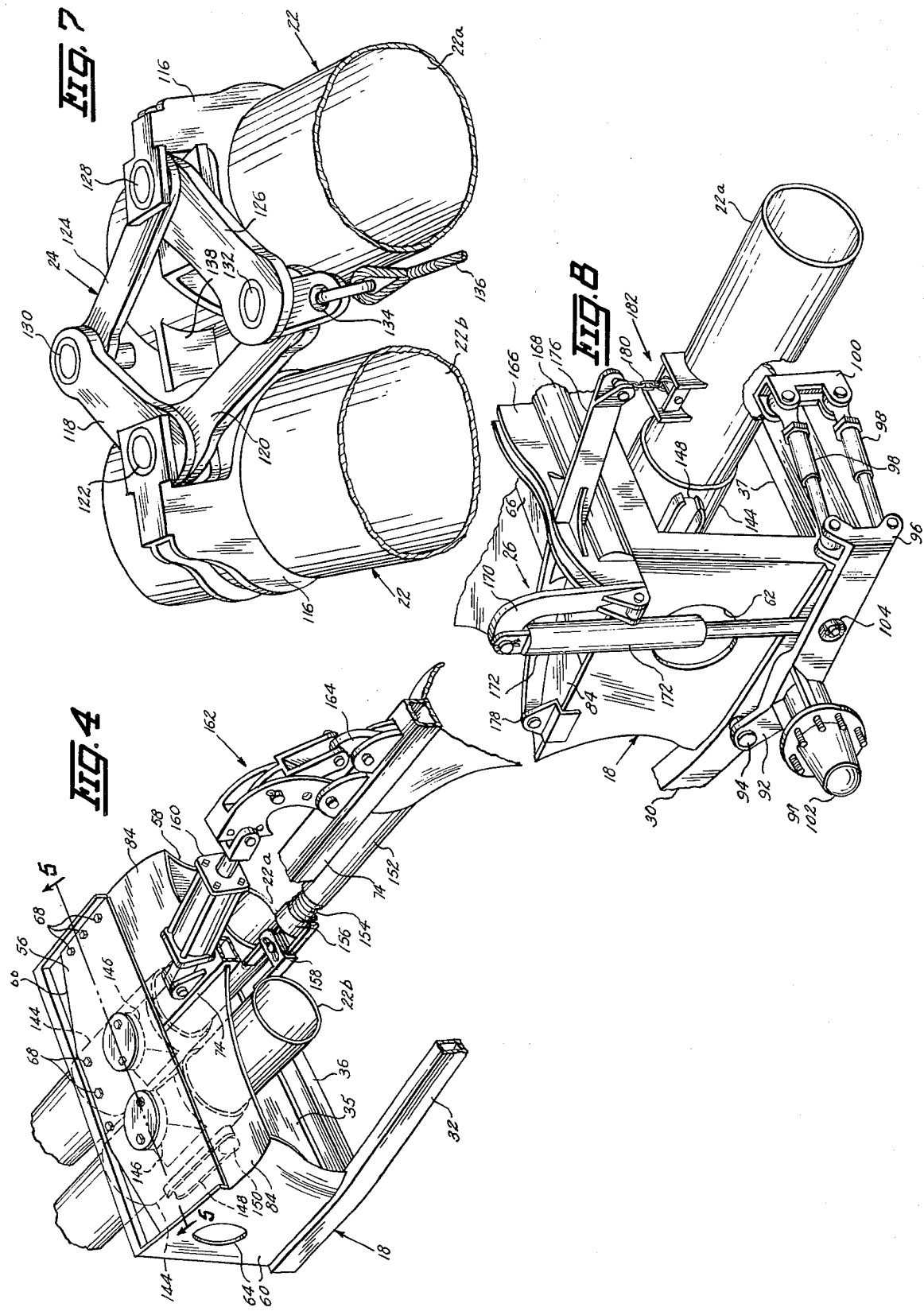

TREE STUMP PULLING MACHINE

BACKGROUND OF THE INVENTION

This invention relates to improvements in a tree stump removing machine and utilizes the principle of a pair of opposed and angularly disposed digging wheels to embraceably engage a stump and roll it out of the ground.

This principle of the generally V shaped oriented digging wheels has previously been employed in the art of harvesting beets as exemplified in U.S. Pat. Nos. 2,682,738, 2,773,343, 2,888,081 and 3,454,099 and such patents, together with others in the same art, have addressed themselves to different aspects of improving the harvesting of beets by innovations in the structure of the digging wheels and their operation. However, it is obvious that the very nature of the growing relationship to the ground as between beets and tree stumps involves problems of removal forces and apparatus with which the machines in the beet harvesting art are neither designed for nor able to cope with and, accordingly, one of the important objects of the present invention is to provide an improved machine having angularly disposed digging wheels capable of quickly and efficiently rolling a tree stump out of the ground so that it may be removed from the area.

Another object herein is to provide a machine of the above class which is trailer mounted and capable of being towed to different destinations for use.

A further object is to provide a novel lifting harness assembly for holding the digging wheels out of ground contact when the road wheels are operational and for holding the road wheels out of ground contact when the digging wheels are operational.

Still another object is to provide a machine as characterized which includes power means for adjusting and maintaining a selected spaced relationship between the digging wheels.

A still further object herein is to provide an improved digging wheel which materially enhances the efficiency of the stump removal operation.

Another object is to provide adjustable tilt features at the forward end of the trailer frame of this machine for accommodation with varying heights of hitch assemblies on different prime movers and to provide certain frame elevational adjustments relative to the digging wheels.

SUMMARY

A trailerable frame or chassis is especially designed to withstand the stresses and forces encountered in the application of power necessary to extract a tree stump from the ground. Powerful digging wheels disposed in a V shaped relationship are mounted at the rear of the frame for embraceably engaging a stump and rolling it free from the ground as the trailer is pulled by a prime mover. Road traveling wheels, preferably of the pneumatic type, are linked to the frame and associated with a power operated lifting harness or mechanism which simultaneously lowers the road wheels and raises the digging wheels for road travel and reverses this arrangement for the removal of stumps. The axle assemblies of the respective digging wheels are associated with mountings that are longitudinally slidable, pivotable at one end and are connected at their other end to a scissor type coupling whereby such wheels are movable towards each other to increase the binding contact on an encountered stump. A separate power means is provided to more positively influence the movement of the digging wheels towards each other and to hold them at any desired position of lateral spacing.

Coltar wheels are provided at the forward end of the trailer with appropriate power adjustment means relative to depth of penetration. The front end of the trailer is also adjustable as to height and inclination to accommodate varying hitch assemblies on prime movers and to alter the elevation of the digging wheels relative to the ground.

The objects and purposes of this invention together with the details of the general operation outlined and the advantages of the same will be more fully described and developed in relation to the more detailed description of the accompanying drawings.

BRIEF DESCRIPTION OF THE DRAWINGS

FIG. 1 is a perspective view, as seen generally from the side, of this stump pulling machine, FIG. 2 is a top plan view thereof, FIG. 3 is an enlarged perspective view of the mobil frame for this machine, FIG. 4 is a fragmentary perspective view taken from the line 4—4 of FIG. 2 to show the forward ends of the slidable tubes associated with the digging wheels and the hydraulic jack assembly connected to the tubes, FIG. 5 is a cross sectional view taken on the line 5—5 of FIG. 4, FIG. 6 is a cross sectional view taken on the 6—6 of FIG. 5, FIG. 7 is an enlarged fragmentary perspective view of the rear portion of the tubes, taken on the line 7—7 of FIG. 2, and with such tubes inverted to show the scissor assembly associated therewith, FIG. 8 is an enlarged perspective view taken from the line 8—8 of FIG. 2 to show the jack assembly for the lifting harness and the linkage assembly for the road wheels, FIG. 9 is a diagrammatic representation of the hydraulic flow lines used with this machine, and FIGS. 10 and 11 are schematic views illustrating the operation of the lifting harness relative to the operational and non operational positions of the road wheels and the digging wheels.

DESCRIPTION OF THE PREFERRED EMBODIMENTS

Referring to the drawings, this machine is designated generally by the numeral 12 as best seen in FIG. 1 and for purposes of description has the forward end 14 and the rear end 16. The more important features which will be described in detail include the mobile frame 18 (FIG. 3), the digging wheels 20 at the rear 16, the sliding tube assembly 22 and the scissor connection or assembly 24 (FIG. 7) associated with the wheels 20 and the lifting harness assembly 26 (FIG. 1) which controls the respective ground engaging and elevated positions of the digging wheels 20 and the road traveling wheels 28.

THE FRAME

Referring now more particularly to FIG. 3, the frame 18 has been especially designed to withstand the severe stresses and strains to which it is subjected as will be apparent. Such frame is a steel welded member including the parallel spaced side rails 30 and 32 connected at the front end 14 by the cross beam 34 and at the rear 16 by the plate 35 which is bordered by the integral cross members 36 and 37.

Plate 35 is provided with the spaced holes 38 and 40 for use as will later appear, said holes being equidistant from the longitudinal center of plate or cross member 35. At each end of beam 34, being the two front corners of frame 18, there is provided the respective vertically disposed mounting brackets 42 and 44 having the spaced ears as shown and each of said ears includes the vertically spaced holes designated 46 and 48 for bracket 42 and 50 and 52 for bracket 44. Suitable gussets 54 are provided for reinforcing brackets 42 and 42 in a well known manner.

Frame 18 includes a superstructure defined in part by the elevated platform 56 spaced above plate 35 and secured by the integral strong panel sides or plates 58 and 60 to the rearward portions of rails 30 and 32. Panels 58 and 60 are provided with the respective large openings 62 and 64 which permit access to certain of the parts not yet described. In addition, a suitable access opening (not shown) is formed in platform 56 and as seen in FIG. 3 is covered by plate 66 which is removably secured to platform 56 by bolts 68. Holes 70 and 72 in plate 66 register with the respective holes 38 and 40 in the lower plate 36. A further part of the superstructure includes the elevated tubular beam 74 extending from welded attachment to the platform 56 longitudinally on a center line between rails 30 and 32 to the forward end 14 where it is secured to the upstanding support 76 and carriers the mounting bracket 78 having spaced ears as shown in which there are a plurality of vertically aligned registering holes 80. Reinforcing gussets 82 intermediate support 76 and beam 74 are provided and the leading edge 84 of platform 56 defines a gusset-like radius in connecting to beam 74. To the forward end of frame 18 as best seen in FIG. 2 there is provided the generally triangular hitch member 86 having the apex located opening 88 for attachment to the hitch pin on a prime mover (not shown) and designed to be pivotally secured as by pins 90 to either the lower sets of holes 48 and 52 and brackets 42 and 44 or to the upper set of holes 46 and 50 therein depending upon the elevation of the hitch pin on the prime mover that may be used. Thus far described, it will be appreciated that frame 18 is extremely durable and strong.

THE ROAD WHEELS

Frame 18 is provided with the relatively large road traveling wheels 28, preferably of the pneumatic type, and these are mounted at opposed rear sides of the frame by a linkage arrangement best seen in FIG. 8. Both wheels 28 are similarly attached so only one will be described and like numerals will be given to like parts. For this purpose, an elongated bar link 92 is pivotally secured at one end to rail 30 as at 94 so as to extend slightly beyond the rear cross member 37 on frame 18. The rearward portion of link 92 is provided with an integral vertical bracket having spaced ears as shown at 96 to which a pair of commercially available longitudinally adjustable connecting rods 98 are pivotally secured at respective ends to the upper and lower ends of member 96. The other ends of rods 98 are similarly secured to bracket 100 that is attached to the rear face of cross member 37. Bracket 100 is of a like design as bracket 96. A stub axle 102 on bar 92 supports wheel 28 in a conventional manner. The lifting harness assembly 26 which will later be referred to in more detail is connected at point 104 to bar 92 as seen in FIG. 8 and thus far described, it will be seen generally that the raising and lowering of bar 92 will correspondingly raise and lower wheels 28 relative to frame 18. The longitudinal adjustment provided by rods 98 permits appropriate alignment and positioning of wheels 28 for road travel, if necessary.

DIGGING WHEELS AND TUBE ASSEMBLY

Reference will now be made to the digging wheels 20 and their related supporting and control components including the tube assembly 22, the scissor unit or coupling 24 and the lifting harness 26 which are important features of this invention. Wheels 20 and the respective tubes and related parts in the tube assembly 22 are of respective like construction so that only one will be described and like parts will be given like numerals where appropriate.

Wheel 20 is of substantial construction, being preferably of steel, and weighing approximately 2300 pounds although this, of course, may be varied. It is generally semispherical in shape defined by the hub 106 from which curved fins 108 extend radially to the rim 110 which I have preferably made with a six foot diameter. Such rim 110 is a scalloped configuration as at 112 designed to facilitate the piercing or cutting of the soil and roots adjacent stumps to be removed. For informational puruposes only, hub 106 has a diameter of approximately 12 inches and the distance on an axial line from the hub 106 to the rim 110 is approximately 35 inches.

A flange 114 integral with rim 110 and in concentric relationship thereto extends therefrom radially inwardly at approximately a five degree angle and serves to effect a secure gripping of a tree stump as will appear. The curved fins 108 in a somewhat paddle wheel like action against the ground dig into the ground and help drive the wheels rather than let them slide or drag.

In the tube assembly 22 to which wheels 20 are attached, I provide the two like elongated tubes 22a and 22b which are in generally closely spaced parallel relationship but capable of movement toward and away from each other as follows. As seen in FIG. 7 which shows the bottom side of the rear end of tubes 22a and 22b, such tubes are connected together by a suitable expandable and retractable coupling here shown in the form of the scissor unit 24 for which any suitable bracing or reinforcing 116 may be employed as shown. Unit 24 includes the two links 118 and 120 each pivotally secured at one end to a mounting on tube 22b as at 122 and links 124 and 126 similarly secured to tube 22a as at 128. The other ends of links 118 and 124 are pivotally attached to each other as at 130 and the other ends of links 120 and 126 are similarly attached as at 132. An eye member 134 is mounted on scissor unit 24 at point 132 and a cable of a fixed length 136 is attached at one end to point 132 and at its other end to the rear cross member 37 of frame 18 as seen in FIG. 2. Thus far described, it will be understood that points 130 and 132 are susceptible of being moved toward and away from each other which will correspondingly move tubes 22a and 22b towards and away from each other. A stop block 138 on one tube, here shown as tube 22a, serves to limit the proximity to each other that tubes 22a and 22b can assume.

On the top side of tubes 22a and 22b at the rear as seen in FIG. 2, which is the opposite side from that seen in FIG. 7, an axle 140 for wheel 20 is mounted on each tube. Such axles 140 are secured in suitable strongly reinforced mountings 142 and extend laterally on an incline downwardly and outwardly from such mountings whereby in the mounting of wheels 20 with suitable bearings in a well known manner, the confronting rims 110 define a V-shape with their converging edges oriented towards the ground so that said rims will rotate in a corresponding diverging and converging relationship to each other.

With reference now more particularly to FIG. 4, I shall describe the attachment of the forward ends of tubes 22a and 22b to the rear portion of frame 18 and to the superstructure previously referred to. Each tube is similarly attached so only one will be described and like numerals will be given to like parts.

A cylindrical collar or sleeve 144 is provided on diametrically opposed sides with the bosses 146 which define the respective top and bottom sides of such collars. Each collar is also provided with diametrically opposed elongated longitudinal slots 148 at 90° to bosses 146. The forward ends of tubes 22a and 22b are slidably journalled through a respective collar 144 and each tube has suitable lugs 150 which extend into slots 148 so that the longitudinal movement of the tubes relative to the collars 144 is limited by the length of the slots 148 which may be on the order of six inches more or less. The bosses 146 on the bottom side of collars 144 are rotatably seated in the respective holes or openings 38 and 40 in plate 35 and when the upper plate 66 is mounted to platform 56 as previously described, openings 70 and 72 will embrace bosses 146 on the top of collars 144 whereby such collars are secured but capable of swivelling or turning on bosses 146 as may be required when the rear ends of tubes 22a and 22b are moved toward and away from each other.

In a tubular housing 152 mounted in juxtaposition to the underside of the elevated beam 74 there is placed a compression spring 154 which, as best seen in FIG. 4, has one end exteriorly of housing 152 seated in a cup fitting 156 that is operatively secured to the forward ends of tubes 22a and 22b by fitting 158 attached to such tubes so as to permit of their movement toward and away from each other as may be affected by operation of the scissor unit 24. A conventional two way hydraulic jack 160 extending between platform 56 and the elevated beam 74 connects with a pivotal lever or crank arm assembly 162 mounted at the forward portion of beam 74. Assembly 162 includes a link 164 adapted to extend into beam 74 for engagement with the forward end of spring 154 whereby the extension of jack 160 will move the lever assembly 162 so that link 164 compresses spring 154 rearwardly which acts to move tubes 22a and 22b rearwardly or by appropriate adjustment of the hydraulic pressure will hold such tubes against forward movement as will later be referred in explaining the operation of this machine.

LIFTING HARNESS

Reference is now made to the lifting harness 26 as best seen in FIGS. 1, 2 and 8 by which the respective ground engaging and elevated positions of the digging wheels 20 and road wheels 28 are obtained. Assembly 26 includes an extremely strong yoke 166 preferably reinforced as at 168 and which is disposed transversely of and on the rear portion of platform 56 of the frame 18 superstructure. A respective upstanding hook shaped arm 170 is pivotally secured at one end to each end of yoke 166 to provide an elevated point represented by the hook end to which there is attached one end of a two way hydraulic jack 172 and with the other end of jack 172 pivotally connected at 104 on link 92 as previously referred to. Secured to and substantially transversely of yoke 166 are the elongated rigid arms 174 and 176. Such arms are fixed to yoke 166 intermediate their ends so as to extend therefrom in part forwardly over frame 18 and in part rearwardly over tubes 22a and 22b and as best seen in FIG. 2, are pivotally attached at their forward ends to the respective ear mountings 178 disposed at opposite side of the forward portion of platform 56. From mountings 178, arms 174 and 176 extend rearwardly across yoke 166 in a slightly converging relationship so that their rear ends terminate above the respective tubes 22a and 22b at a point somewhat forwardly of the mountings for axles 140 and such rear ends each carry a relatively short but heavy and sturdy lifting chain 180 that is anchored to a suitable mounting 182 on the respective tubes.

Within the forward portion of frame 18 just rearwardly of the hitch member 86, I have mounted a pair of colter wheels 184 which function as is well known in breaking the ground and cutting up small sticks and branches. The mounting assembly 186 for the colter 184 (FIG. 2) includes the shock absorber like coil spring 188 suitably arranged relative to frame 18. A third two way hydraulic jack 190 is pivotally connected at one end to the top of hitch 86 and at its other end is similarly connected to the ear mounting bracket 78 at the forward end of beam 74. The vertically spaced pairs of holes 80 in mounting 78 afford a selective attachment point for jack 190 as will be apparent. Thus constructed and arranged, this machine will operate as follows.

OPERATION

It will be understood that machine 12 is pulled by an appropriate prime mover (not shown) to which it is connected by hitch 86 as described and that the hydraulic system for the several hydraulic jacks described and as represented schematically in FIG. 9 will be connected to a source of hydraulic power on the prime mover in a well known manner. For road travel, wheels 28 are in contact with the ground or roadway 192 and the digging wheels 20 are out of ground contact as seen in FIG. 10 and with the reverse relationship existing in stump removal operations as seen in FIG. 11. For these purposes, with jacks 172 of the lifting harness assembly 26 retracted, bars 92 carrying the stub axles 102 for wheels 28 are elevated whereby the weight of wheels 20 will allow them to drop onto the ground by the pivoting of the forward ends of arms 174 and 176 in the respective ears 178.

As jacks 172 are extended to move wheels 28 into ground contact, the resistance of wheels 28 upon such contact and the continued extension of the jacks results in an upwardly lifting force being applied to yoke 166 that is transmitted through arms 174 and 176 to the fulcrum point at ears 178 whereby the force at points 178 is resisted by the ground engaging road wheels 28 to provide a considerable lifting power at the opposite ends of arms 174 and 176 where tubes 22a and 22b and the digging wheels 20 are elevated by chains 180 out of ground contact. During this operation, wheels 28 are subjected to approximately twenty four thousand pounds of pressure and the proper alignment of such wheels is maintained by rods 98 which are mounted as described to brackets 96 and 100 (FIG. 8) and thus permit the vertical movement of bracket 96 without affecting its predetermined lateral spaced relationship to bracket 100 and the corresponding relationship of bars 92 to rails 30 and 32 on frame 18. It will thus be appreciated that by the arrangement of the lifting harness assembly 26 wherein the point of lifting at chains 180 is behind the point of the application of power to yoke 166 and behind the pivot points 178 for arms 174 and 176 and with points 178 disposed over frame 18, a most efficient means is provided to effect the elevation only of the rearward end of this machine at which the digging wheels 20 are located.

With the digging wheels 20 in ground engagement and the road wheels 28 elevated as seen in FIG. 11 for stump removal operation, the weight of wheels 20 and their biting into the ground as the machine 12 is pulled forwardly will urge tubes 22a and 22b to their rearward position of travel relative to collars 144 and with cable 136 which is of a fixed length and being connected to frame member 37 and eye 134 of the scissor assembly 24, points 122 and 128 of such assembly (FIG. 7) will be drawn towards each other to correspondingly move tubes 22a and 22b and wheels 20 closer together and the narrowest separation of such wheels is determined by contact of stop 138 on tube 22a with tube 22b. As tubes 22a and 22b are thus moved towards and away from each other at the rear by the scissor unit 24, the relative movement of the forward ends of such tubes away and towards each other is provided by the pivotal or swivel relationship of collars 144 to frame 18 as described.

To assist in urging the wheels 20 to their narrowest separation in approaching or encountering a stump, the hydraulic circuit used is such that when the road wheels 28 are elevated, fluid to jack 160 is under pressure so that jack 160 can be actuated to compress spring 154 which in turn applies a rearward force to tubes 22a and 22b. Likewise, when wheels 28 are down and wheels 20 are elevated, excess fluid pressure to jacks 172 is bypassed to jack 160 to effect its retraction and release pressure against spring 154.

Tubes 22a and 22b are designed to have a longitudinal travel of approximately 6 inches which affords appropriate movement of the scissor unit 24 so that wheels 20 can be efficiently employed on stumps ranging from 5 to 28 inches in diameter. The stumps to be removed will have generally been cut off close to the ground and as machine 12 is moved over the same, the colter wheels 184 will break and loosen the ground and cut up small sticks and branches. The depth of penetration of such colter wheels can be adjusted by jack 190 which also serves for a height adjustment at the front end of machine 12 that correspondingly provides a similar adjustment for wheels 20 at the rear.

As the digging wheels 20 engage a stump and are urged towards each other by the action of the scissor unit 24 and jack 160 as described, the flange 114 on rim 110 provides a vise-like grip upon the stump to aid in lifting it from the ground as wheels 20 roll forwardly. Accordingly, from all of the foregoing, it is thought a full understanding of the construction and operation of this invention will be had and the advantages of the same will be appreciated.

I claim:

1. In a tree stump pulling machine having a towable frame and rearwardly disposed operatively associated confronting digging wheels to engage a stump and roll it out of the ground, said frame comprising:

parallel spaced side rails having forward and rear ends, respective cross members secured to and connecting said rails at said forward and rear ends, a rigid plate extending between and secured to the rear end portions of said rails, said plate being provided with a pair of spaced openings, an upstanding rigid plate on each rail adjacent the rear end thereof, an upstanding rigid support on the cross member at the forward ends of said rails, a frame superstructure comprising:

a platform extending between and secured to the upper ends of said plates at the rear end portion of said rails, an elevated horizontal beam disposed on substantially the center line between said rails and extending between and secured to said platform and said upstanding support, and said platform being provided with a pair of spaced openings to register respectively with said openings in said plate.

2. A machine as defined in claim 1 including:

a pair of elongated spaced parallel collars each pivotally mounted intermediate their respective opposite ends to the rear of said frame for movement away from and to parallel position, means for slidably journalling the respective forward ends of said tubes in said respective collars for forward and rearward movement therein, and stop means on said collars operatively associated with said tubes to limit the forward and rearward movement of said tubes relative to said collars.

3. A machine as defined in claim 2 including:

said collars being mounted on said frame intermediate said plate and said platform, each of said collars having diametrically opposed external bosses pivotally seated respectively in the registering openings in said plate and said platform, each of said collars being provided with opposed longitudinal slots, and opposed external lugs on the forward ends of each tube disposed in respective slots in said respective collars.

4. A machine for pulling tree stumps out of the ground comprising:

a towable frame having a front end and a rear end, a pair of elongated spaced parallel collars each pivotally mounted intermediate their respective opposite ends to the rear of said frame for movement away from and to parallel positions, a pair of elongated spaced generally parallel tubes having forward and rear ends, means for slidably journalling the respective forward ends of said tubes in said respective collars for forward and rearward movement therein, stop means on said collars operatively associated with said tubes to limit the forward and rearward movement of said tubes relative to said collars, respective opposed axles on said tubes at the rear thereof each extending laterally outwardly and downwardly, a digging wheel rotatably mounted on each axle whereby said wheels are in a confronting V shape so that their narrowest separation is towards ground level with said wheels adapted to be embraceably introduced to a tree stump so as to engage the same and roll it out of the ground as said frame is towed by a prime mover, a laterally expandable and retractable coupling connected to and between said tubes intermediate the points of attachment of said axles thereto, and means operable between said frame and said coupling to effect the expansion and retraction thereof whereby in expansion the forward ends of said tubes are in forward slidable position and said coupling is at its widest point of expansion to effect the widest point of separation between said tubes and said digging wheels and in retraction said tubes are moved towards their rearward slidable position with said coupling narrowing and acting to move the rear ends of said tubes and digging wheels towards each other.

5. A machine as defined in claim 4 including:

a respective wheel supporting linkage assembly at opposed sides of said frame near the rear end thereof and pivotally secured at one end to said frame, a respective stub axle on said linkage assemblies, a respective road travelling wheel rotatably mounted to each each stub axle, a lifting harness assembly mounted to said frame and operatively connected to said linkage assemblies to raise and lower said linkage assemblies, and means operatively connecting said lifting harness assembly to said tubes near the axles thereon to raise and lower said tubes in reverse directions to movement of said linkage assemblies whereby the operation of said lifting harness assembly to lower said linkage assembly and move said road wheels into ground contact effects the simultaneous elevation of said digging wheels out of ground contact and the operation of the lifting harness assembly to elevate said road wheels out of ground contact simultaneously effects the lowering of said digging wheels into ground contact.

6. A machine as defined in claim 5 wherein said lifting harness assembly includes:

a yoke disposed across the top of said frame at the rear thereof, respective first hydraulic jacks operatively connected between the respective ends of said yoke and said respective linkage assemblies, a pair of rigid elongated lifting arms in spaced relationship to each other secured intermediate their lengths to said yoke so as to extend in part forwardly from said yoke over said frame and in part rearwardly from said yoke over said tubes, means for pivotally attaching the forward end of each lifting arm to said frame, and means on the rearward end of each lifting arm operatively secured to a respective tube.

7. A machine as defined in claim 5 including:

a bracket on the rear of said frame, and a horizontal longitudinally adjustable connecting rod pivotally secured at one end to said bracket and similarly secured at its other end to said linkage assembly whereby the aligned position of said linkage assembly relative to said frame can be determined to maintain proper alignment of said road wheels.

8. A machine as defined in claim 4 including:

said coupling being a scissor type unit assembly including pivotally connected link members, and a cable of fixed length secured at one end to one pivotal connection on said scissor type unit assembly and at the other end secured to the rear end of said frame.

9. A machine as defined in claim 4 including a stop member on one of said tubes intermediate the respective point of attachment of the opposed axles and projecting towards said other tube whereby in the movement of said tubes towards each other by said coupling, said stop will be abutted by said other tube to limit the movement of said tubes towards each other.

10. A machine as defined in claim 4 including a second hydraulic jack mounted to said frame and operatively connected to the forward ends of said tubes to selectively act against said tubes in effecting their respective forward and rearward slidable movement and in holding them against forward movement at selected points of travel.

11. A machine as defined in claim 10 including:

an elongated compression spring on said frame having one end operatively attached to the front ends of said tubes, and said hydraulic jack being disposed to act against the other end of said spring to compress the same.

12. A machine as defined in claim 4 wherein said frame includes:

parallel spaced side rails having forward and rear ends, respective cross members secured to and connecting said rails at said forward and rear ends, a rigid plate extending between and secured to the rear end portions of said rails, said plate being provided with a pair of spaced openings, an upstanding rigid plate on the rear end portion of each rail, an upstanding rigid support on the corss member at the forward ends of said rails, a frame superstructure comprising:

a platform extending between and secured to the upper ends of said plates at the rear end portion of said rails, an elevated horizontal beam disposed on substantially the center line between said rails and extending between and secured to said platform and said upstanding support, and said platform being provided with a pair of spaced openings to register respectively with said openings in said plate.

13. A machine as defined in claim 12 including:

said collars being disposed on said frame intermediate said plate and said platform, each of said collars having diametrically opposed external bosses pivotally seated respectively in the registering openings in said plate and said platform, each of said collars being provided with opposed longitudinal slots, and opposed external lugs on the forward ends of each tube disposed in respective slots in said respective collars.

14. A machine as defined in claim 4 including:

a hitch member pivotally secured at one end to the forward end of said frame and means at its other end for attachment to a prime mover, and a separate hydraulic jack extending between and operatively secured to said hitch member and the forward end of said elevated beam whereby the forward end of said frame can be selectively raised and lowered and correspondingly lower and raise said digging wheels relative to the ground.

* * * * *